United States Patent
Nakagawa et al.

(10) Patent No.: US 10,055,172 B2
(45) Date of Patent: Aug. 21, 2018

(54) PRINTER CONFIGURED TO RECEIVE PRINT JOB COMMUNICATED FROM OPERATION TERMINAL AFTER DETERMINING THAT PRINT JOB IS ACCEPTABLE

(71) Applicant: Brother Kogyo Kabushiki Kaisha, Nagoya-shi, Aichi-ken (JP)

(72) Inventors: Kazuya Nakagawa, Nagoya (JP); Koichi Kondo, Inuyama (JP); Yoshitsugu Tomomatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/438,849

(22) Filed: Feb. 22, 2017

(65) Prior Publication Data
US 2017/0249107 A1  Aug. 31, 2017

(30) Foreign Application Priority Data
Feb. 29, 2016 (JP) .................................. 2016-037505

(51) Int. Cl.
*G06F 15/00* (2006.01)
*G06F 3/12* (2006.01)
(Continued)

(52) U.S. Cl.
CPC .......... *G06F 3/1204* (2013.01); *B41J 3/4075* (2013.01); *G06F 3/121* (2013.01); *G06F 3/1232* (2013.01);
(Continued)

(58) Field of Classification Search
None
See application file for complete search history.

(56) References Cited

U.S. PATENT DOCUMENTS

2009/0086261 A1* 4/2009 Irino ..................... G06F 21/608
358/1.15
2012/0162710 A1* 6/2012 Kawabata .......... H04N 1/00244
358/1.15
(Continued)

FOREIGN PATENT DOCUMENTS

JP  H11-110157 A  4/1999
JP  2003-163711 A  6/2003
(Continued)

OTHER PUBLICATIONS

Jun. 26, 2018—(JP) Notification of Reasons for Refusal—App 2016-037505, Eng Tran.

*Primary Examiner* — Henok A Shiferaw
(74) *Attorney, Agent, or Firm* — Banner & Witcoff, Ltd.

(57) ABSTRACT

The disclosure discloses a printer including a first memory that stores computer-executable instructions that cause the printer to perform a terminal searching process, a job receiving process, and a coordination control process. In the terminal searching process, it is searched whether any of the operation terminals retains the printing job conforming to an accepting condition or not, by performing the mutually-recognized communication triggered by reception of a signal of an action-starting operation in a starting operation accepting process. In the job receiving process, in the case that some of the operation terminals retain the printing job conforming to the accepting condition, the printing job from the operation terminal is received. In the coordination control process, the printing head and the feeder are controlled in coordination with each other in the manner that the printed matter in accordance with print data in the printing job is produced.

18 Claims, 11 Drawing Sheets

(51) Int. Cl.
*B41J 3/407* (2006.01)
*G06K 15/00* (2006.01)
*G06K 15/02* (2006.01)

(52) U.S. Cl.
CPC .......... *G06F 3/1268* (2013.01); *G06F 3/1273* (2013.01); *G06F 3/1275* (2013.01); *G06K 15/007* (2013.01); *G06K 15/022* (2013.01); *G06K 2215/0097* (2013.01)

(56) References Cited

U.S. PATENT DOCUMENTS

| | | | |
|---|---|---|---|
| 2012/0224014 A1* | 9/2012 | Katsumata | B41J 2/36 347/194 |
| 2012/0224202 A1* | 9/2012 | Ito | B41J 11/008 358/1.12 |
| 2013/0004223 A1 | 1/2013 | Hirabayashi et al. | |

FOREIGN PATENT DOCUMENTS

| | | |
|---|---|---|
| JP | 2007-148996 A | 6/2007 |
| JP | 2012-4996 A | 1/2012 |
| JP | 2013-15950 A | 1/2013 |
| JP | 2014-104701 A | 6/2014 |
| JP | 2015-111424 A | 6/2015 |
| JP | 2015-225586 A | 12/2015 |

\* cited by examiner

[FIG. 1]
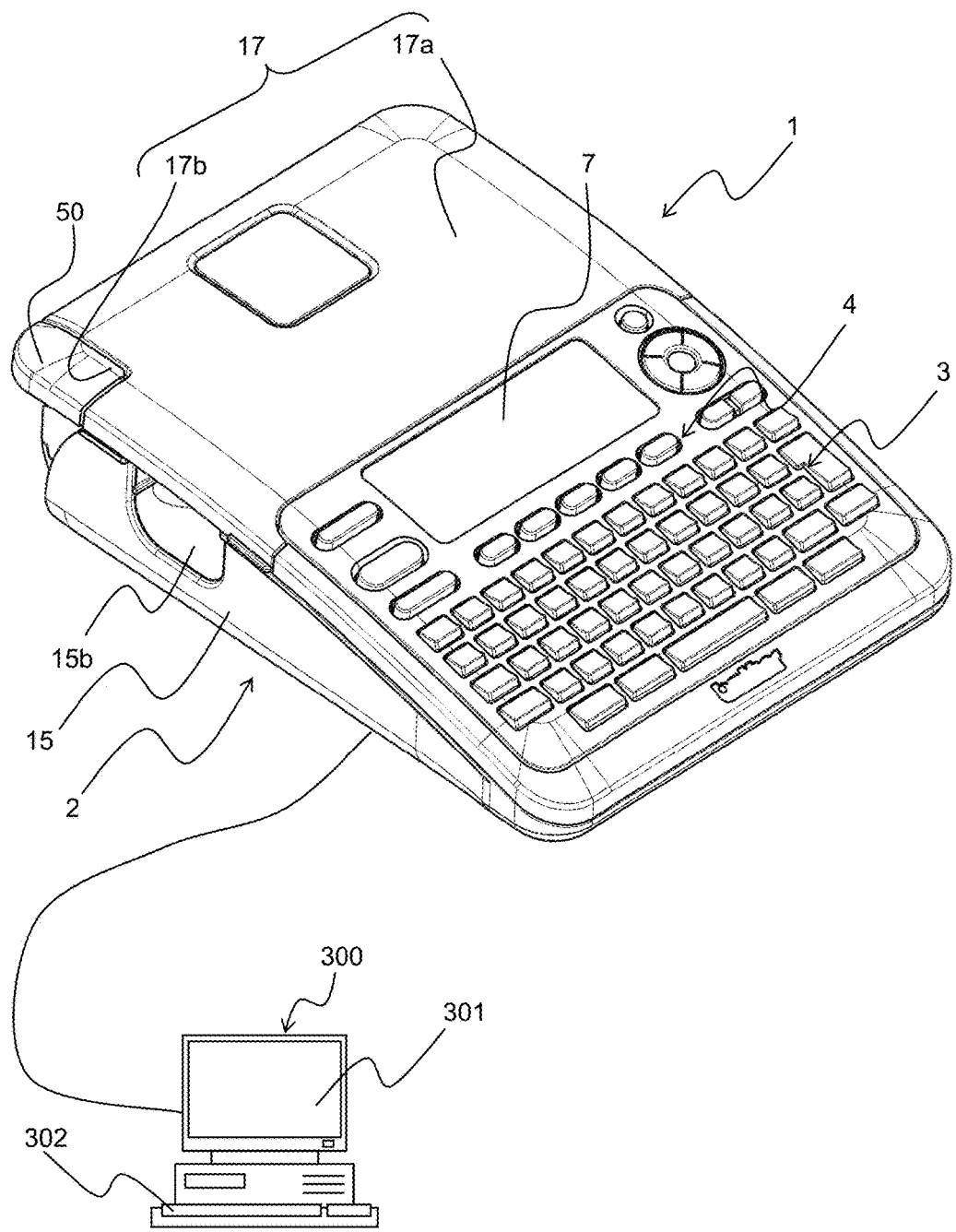

[FIG. 2]
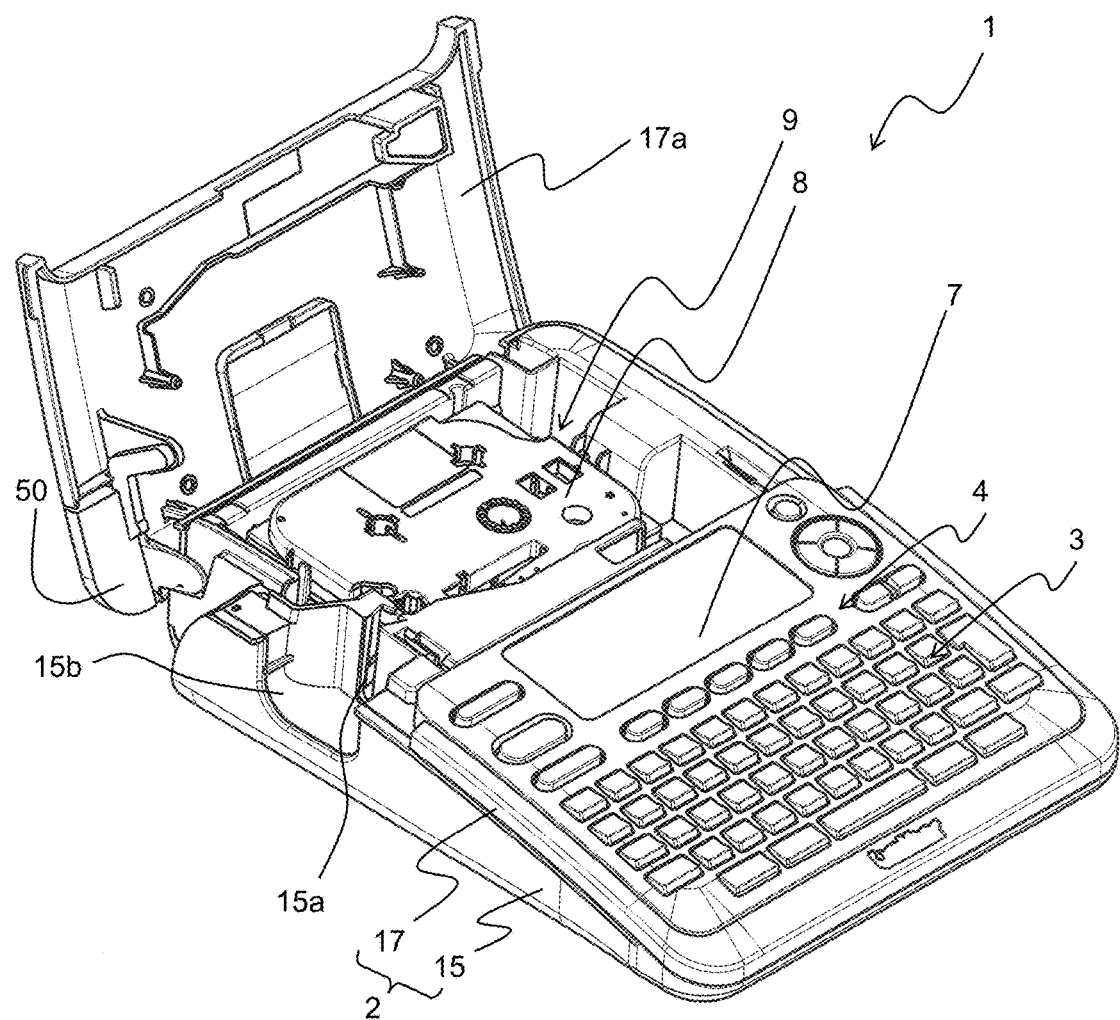

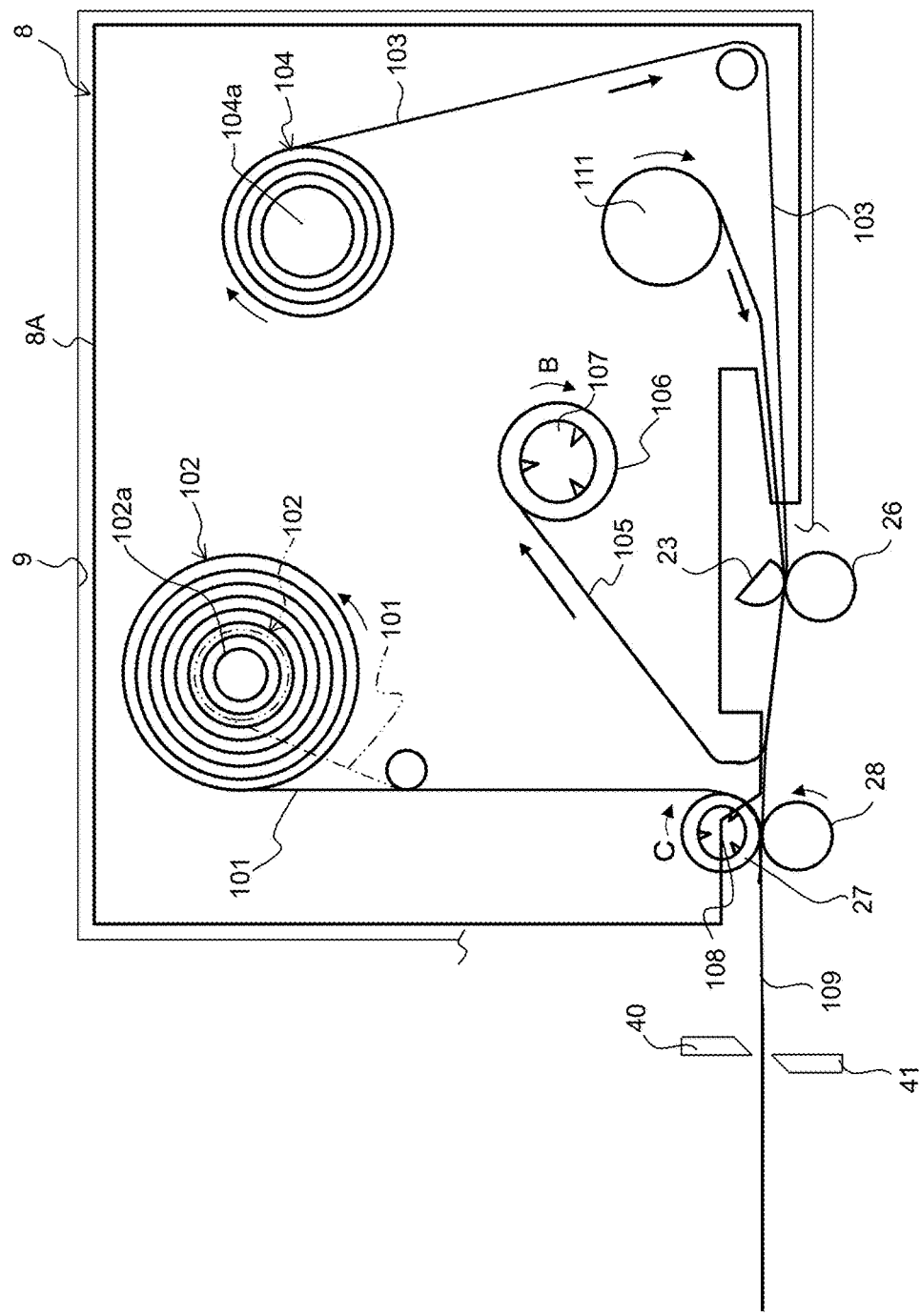
[FIG. 3]

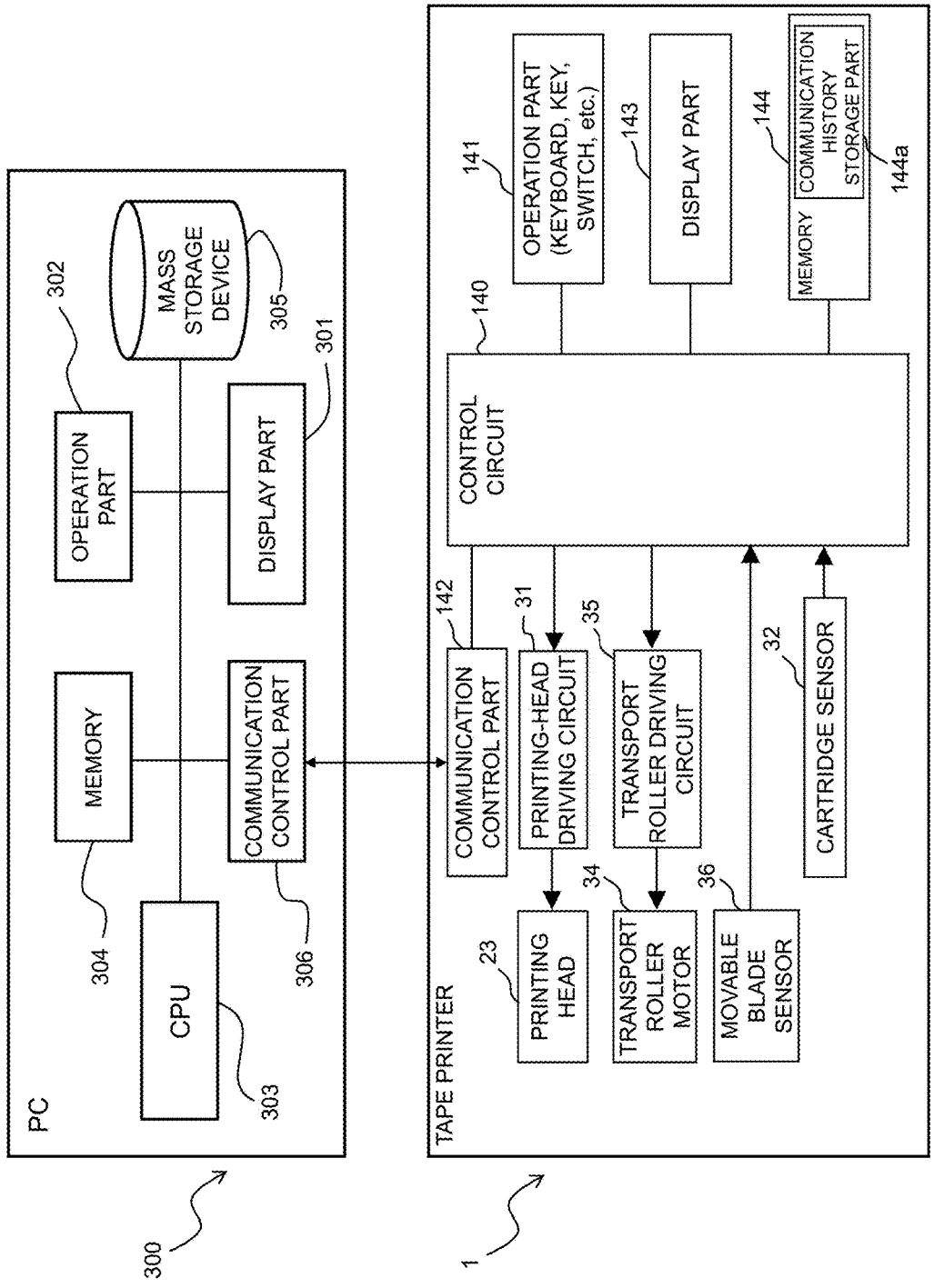
[FIG. 4]

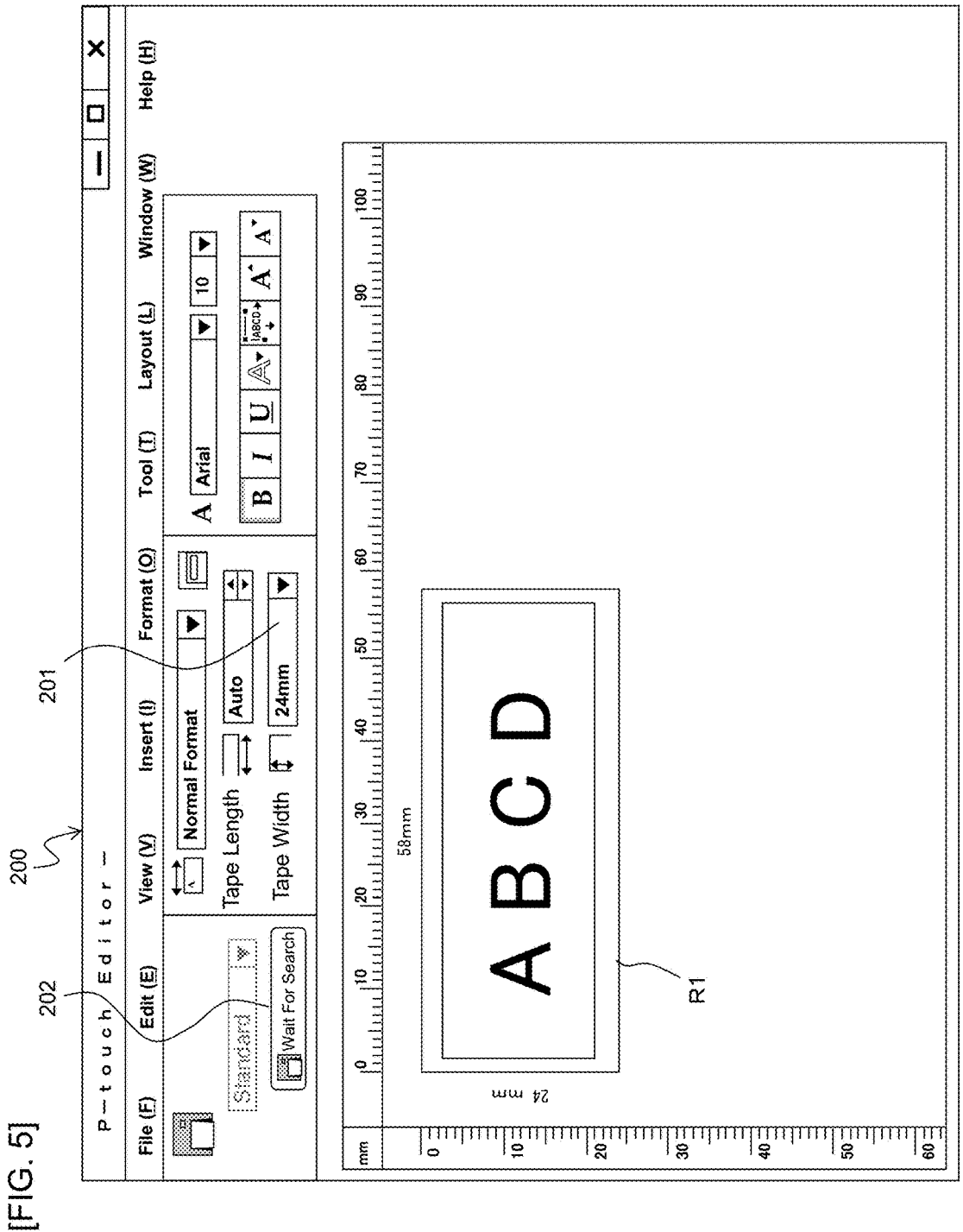

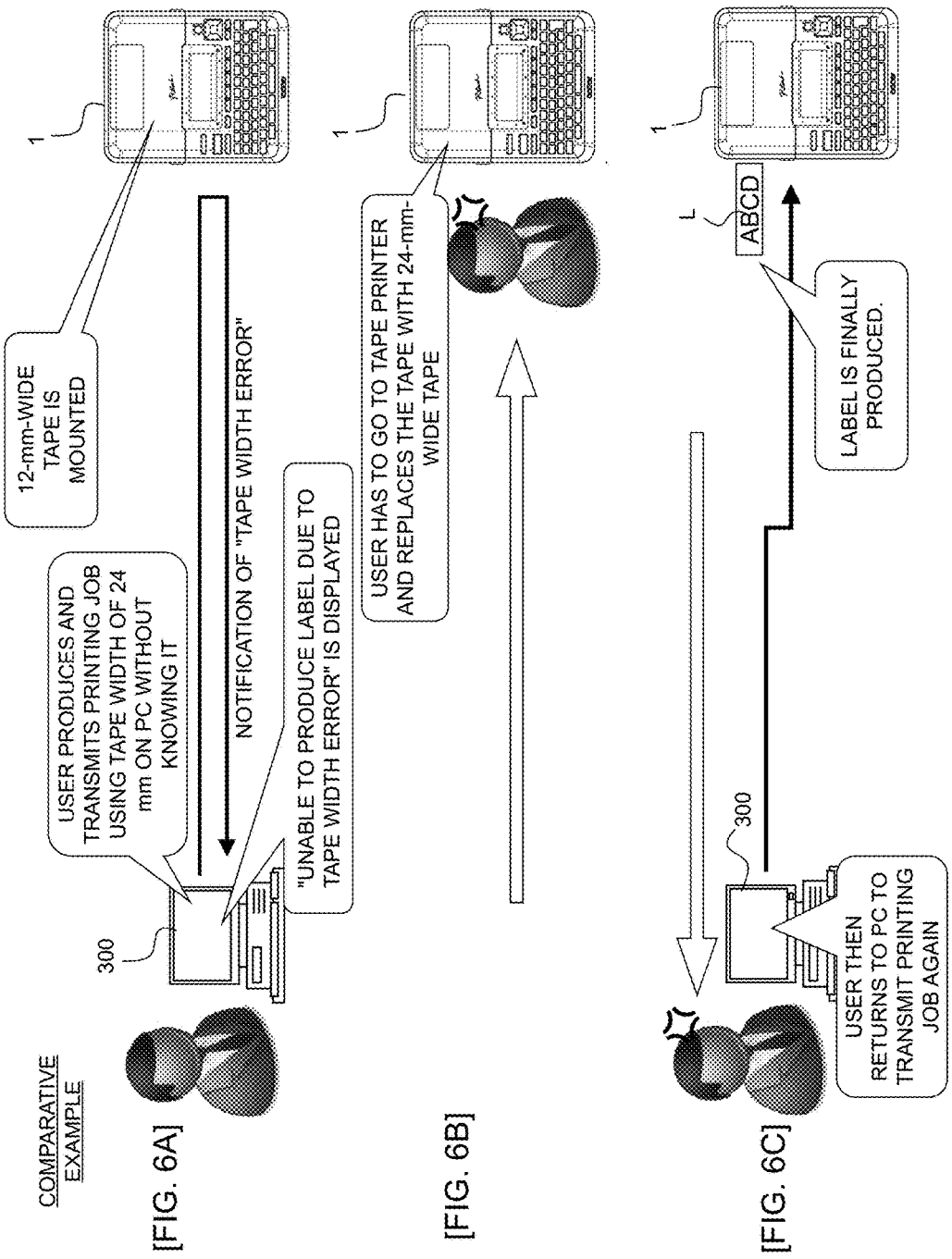

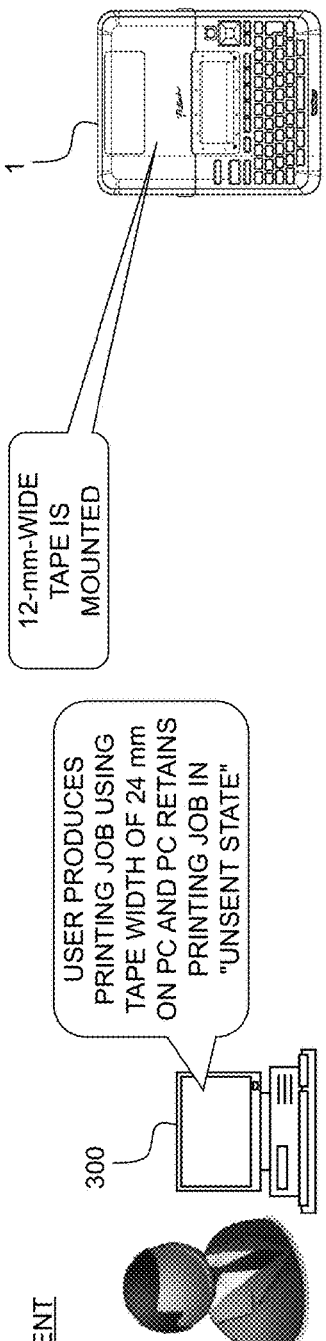
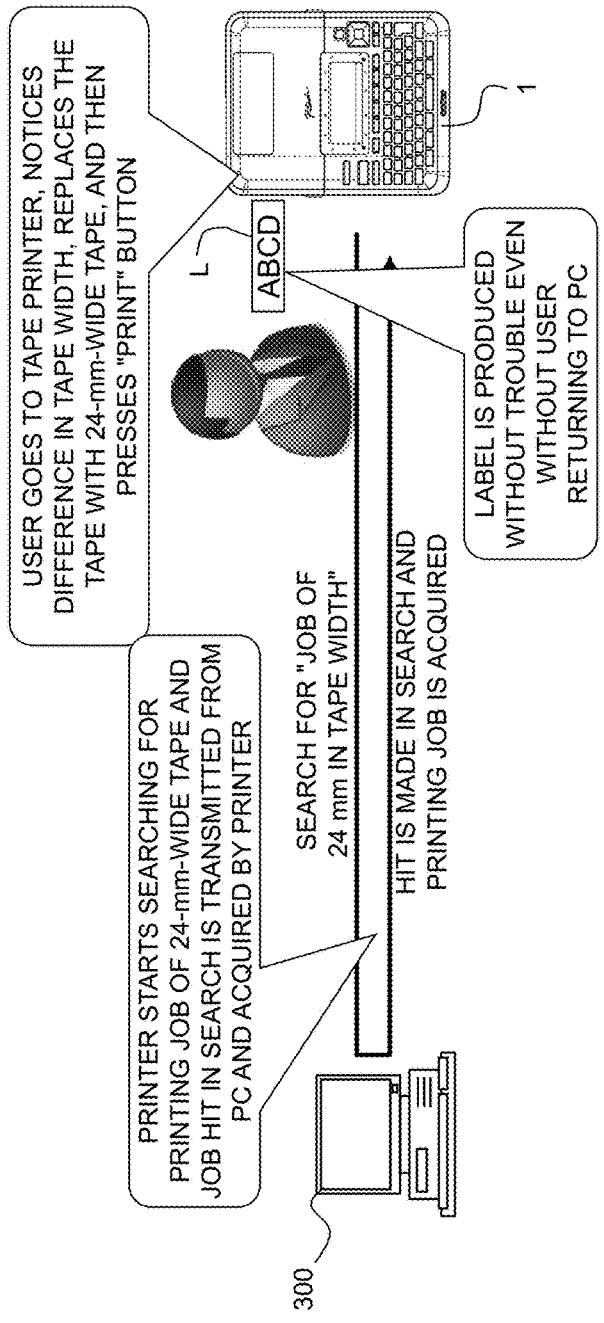

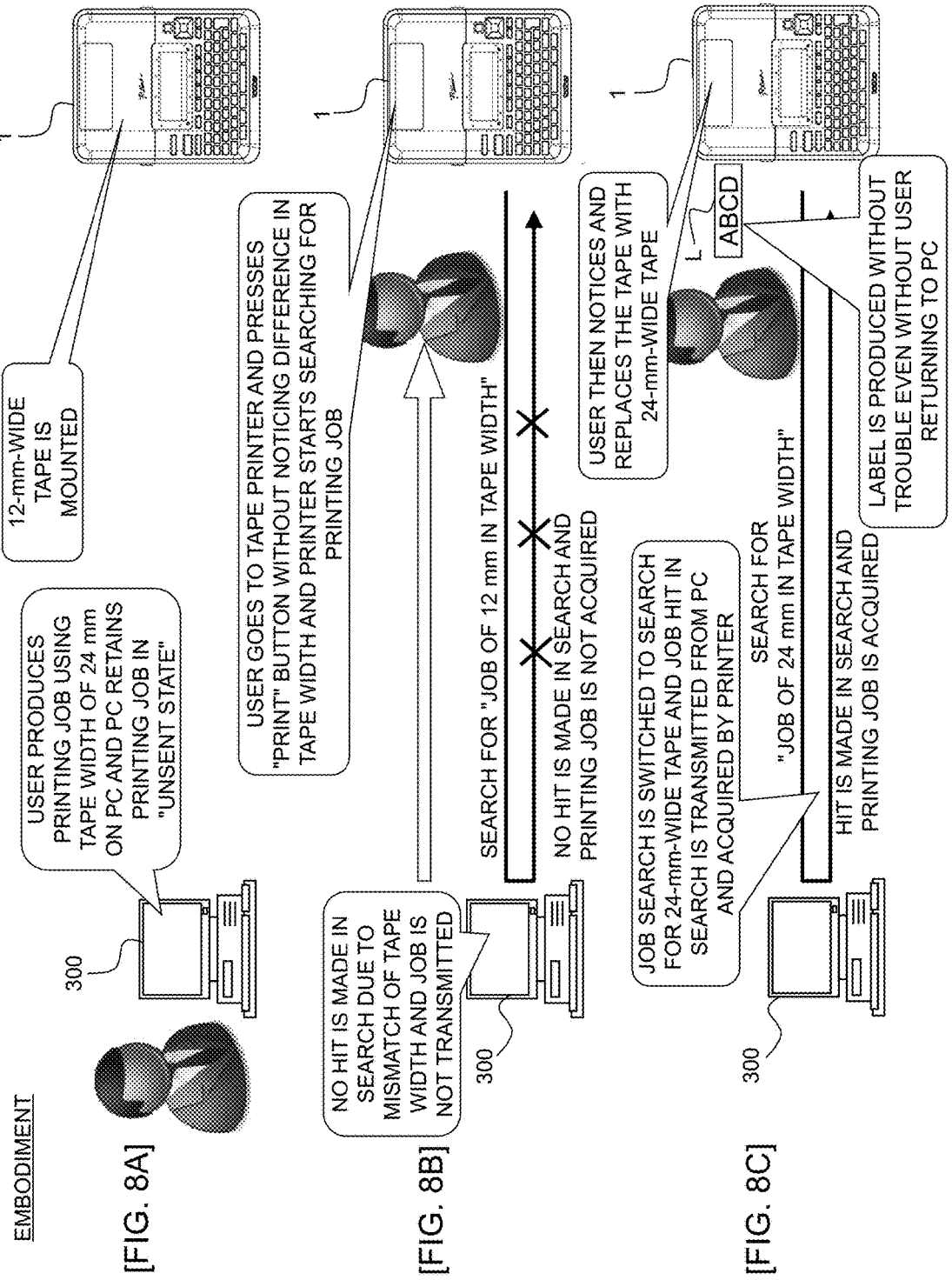

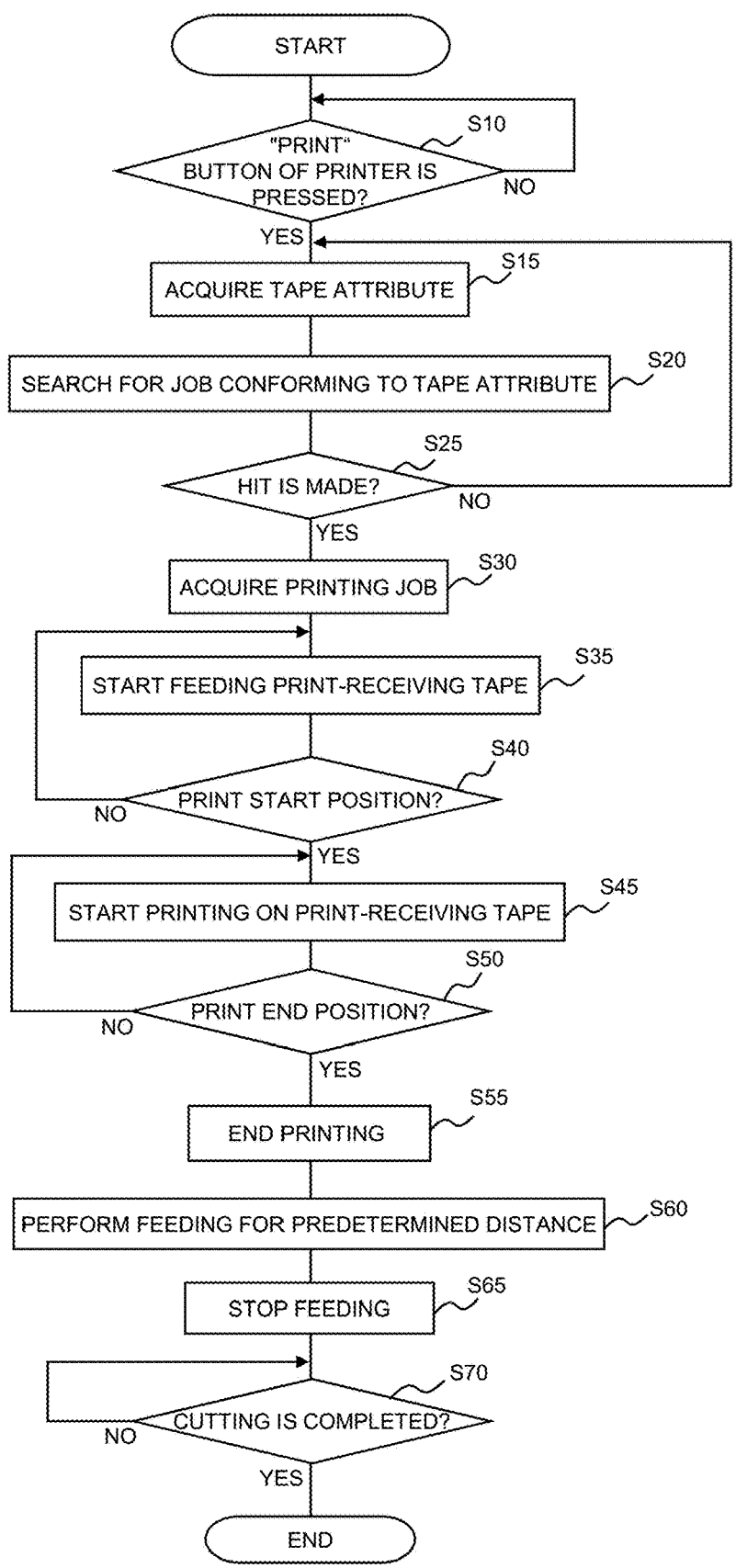
[FIG. 9]

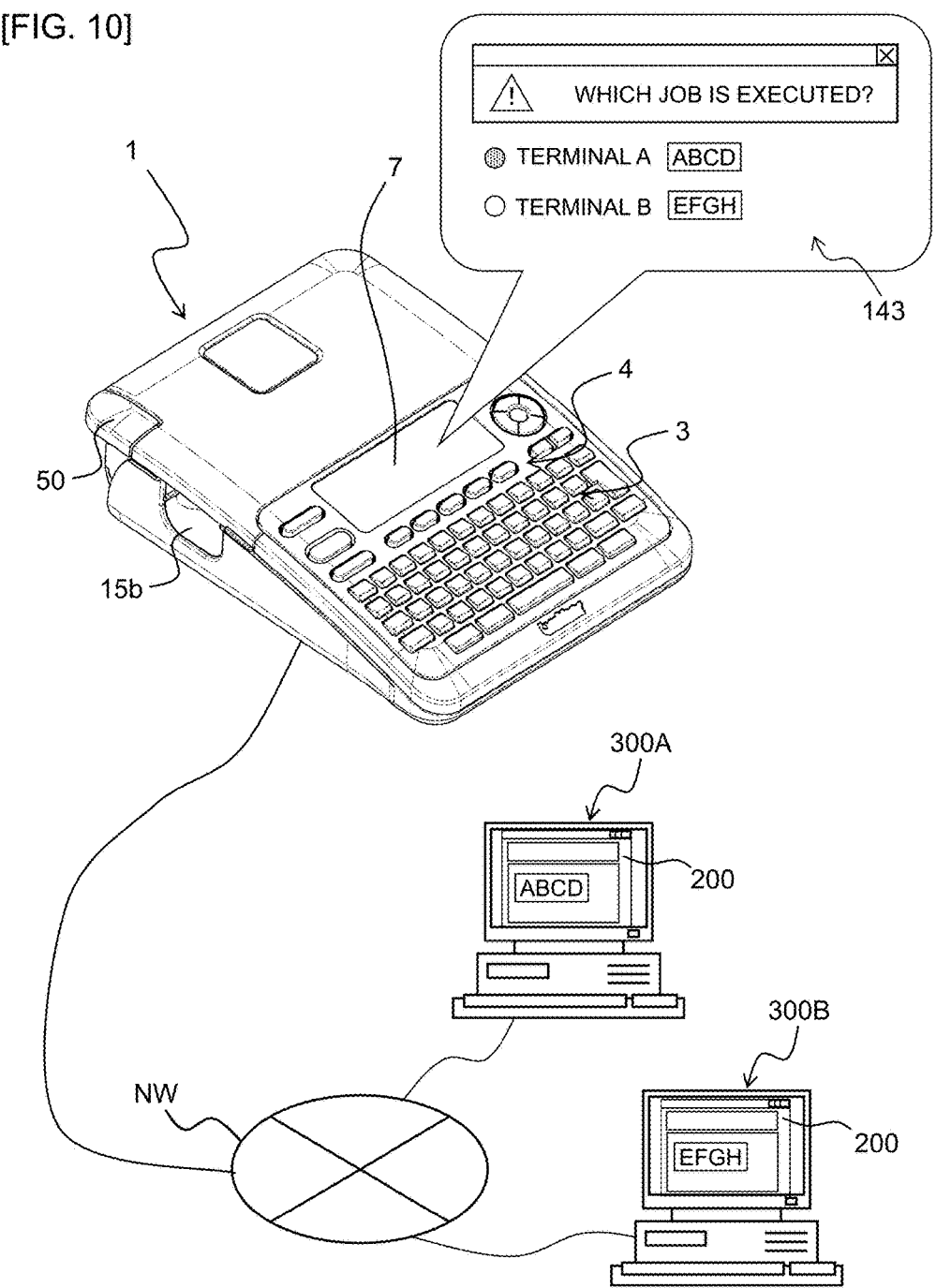
[FIG. 10]

[FIG. 11]
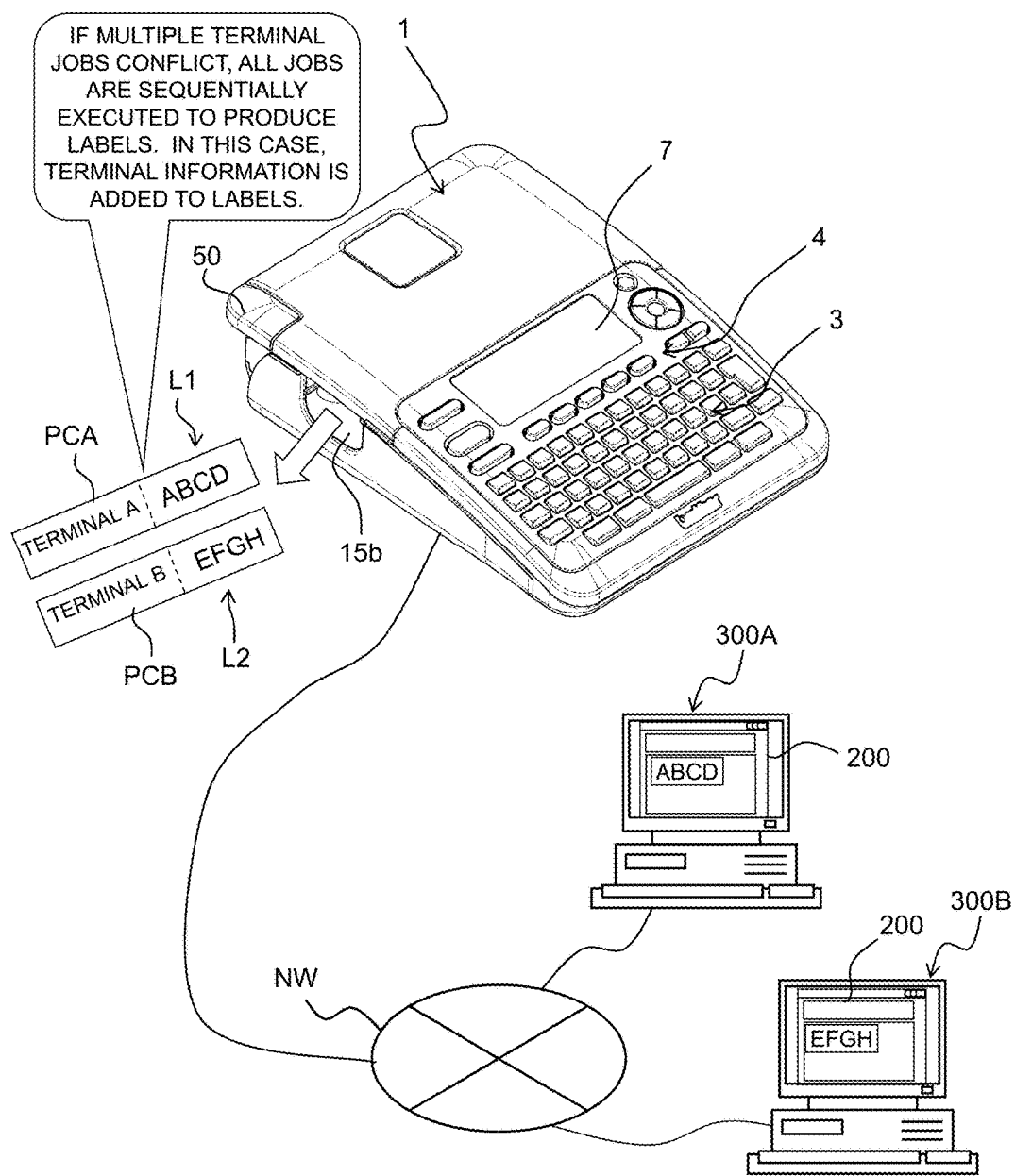

PRINTER CONFIGURED TO RECEIVE PRINT JOB COMMUNICATED FROM OPERATION TERMINAL AFTER DETERMINING THAT PRINT JOB IS ACCEPTABLE

CROSS-REFERENCE TO RELATED APPLICATION

The present application claims priority from Japanese Patent Application No. 2016-37505, which was filed on Feb. 29, 2016, the disclosure of which is incorporated herein by reference in its entirety.

BACKGROUND

Field

The present disclosure relates to a printer performing a desired print on a print-receiving medium.

Description of the Related Art

A printer is known that receives a printing job from an operation terminal (information terminal) to perform printing. This printer is capable of mutually-recognized communication with an operation terminal connected through a network and receives a printing job produced by the operation terminal so as to produce a corresponding printed matter by using print data included in the print job.

In the configuration of the prior art, for example, a printing job produced by an operation terminal may have contents unacceptable for (not conforming to an accepting condition of) the printer. For example, this accepting condition may be a tape attribute when the print-receiving medium is a tape (print-receiving tape). Specifically, a tape attribute (e.g., tape width) assumed in a printing job produced by the operation terminal may not match the tape attribute (for example, the tape width) of the print-receiving tape to be actually printed by the printer.

In such a case, if a user produces a printing job on the assumption of a certain tape attribute on the operation terminal and then transmits the printing job to the printer, a predetermined error display is normally displayed on the operation terminal due to a difference in the tape attribute of the printer. As a result, in this state, the user must go to the printer to replace the print-receiving tape to be printed by the printer to conform to the tape attribute of the printing job (in other words, to match the tape attribute) before transmitting the printing job again to the printer, which leads to large burdens of movement and operation.

SUMMARY

It is therefore an object of the present disclosure to provide a printer capable of generating a corresponding printed matter without forcing large burdens of movement and operation even if a printing job from an operation terminal does not satisfy an accepting condition of a printer.

In order to achieve the above-described object, according to an aspect of the present application, there is provided a printer comprising a feeder, a printing head, a communicating device, a processor, and a first memory. The feeder is configured to feed a print-receiving medium. The printing head is configured to perform a print on the print-receiving medium fed by the feeder. The communicating device is configured to execute mutually-recognized communication with at least one operation terminal that retains a printing job for requesting production of a printed matter in an unsent state. The detecting device is configured to detect an accepting condition of the print-receiving medium fed by the feeder, the accepting condition being related to whether print data from the operation terminal is acceptable or not. The first memory stores computer-executable instructions that, when executed by the processor, cause the printer to perform a starting operation accepting process, a terminal searching process, a job receiving process, and a coordination control process. In the starting operation accepting process, a signal of a predetermined action-starting operation is received. In the terminal searching process, it is searched whether any of the operation terminals retains the printing job conforming to the accepting condition detected by the detecting device or not, by means of performing the mutually-recognized communication via the communicating device triggered by reception of the signal of the action-starting operation in the starting operation accepting process. In the job receiving process, in the case that some of the operation terminals retain the printing job conforming to the accepting condition in the terminal searching process, the printing job from the operation terminal by the mutually-recognized communication via the communicating device is received. In the coordination control process, the printing head and the feeder are controlled in coordination with each other in the manner that the printed matter in accordance with print data included in the printing job received in the job receiving process is produced.

In the printer of the present disclosure, a feeder feeds a print-receiving medium and a printing head performs a desired print on the fed printing-receiving medium, thereby producing a printed matter. In this case, the printer is capable of mutually-recognized communication with at least one operation terminal via a communicating device and can receive a printing job produced by the operation terminal so as to produce a corresponding printed mater by using print data included in the printing job.

In the present disclosure, the printer executes a terminal searching process and a job receiving processing. The operation terminal is configured to retain the printing job in an unsent state. In the printer, first, a detecting device detects the accepting condition (a tape width defined as a tape attribute in the example) for the print-receiving medium to be printed. Subsequently, reception of an action-starting operational signal in a starting operation accepting process triggers mutually-recognized communication via the communicating device in the terminal searching process so as to search whether any operation terminal retains a printing job conforming to the accepting condition detected by the detecting device (the printing job with the tape attribute matching the attribute of the tape actually mounted on the printer in the example) in the unsent state. If any operation terminal has the printing job conforming to the accepting condition, the print job is received from the operation terminal through the mutually-recognized communication in the job receiving process. Subsequently, in a coordination control process, a printed matter is produced by the printing head and the feeder in accordance with the print data included in the received printing job.

As described above, in the present disclosure, the operation terminal retains the printing job in the unsent state and, in this state, the printer searches for an operation terminal having a printing job conforming to the accepting condition of the printer (the tape attribute in the example) and receives the printing job only from the conforming operation terminal to produce the corresponding printed matter. Therefore, even if the tape attribute of the printing job produced by the operation terminal as described above does not match that of the printer, a user only requires to go to the printer and replace the print-receiving tape to conform to the tape attribute of the printing job (in other words, to match the tape attribute) for producing the printed matter corresponding to the printing job without operating the operation terminal again to transmit the printing job. As a result, the burdens of movement and operation as described above can be reduced and the convenience can therefore be improved.

Particularly in this case, the search in the terminal searching process is triggered by reception of the signal of the action-starting operation in the starting operation process. This eliminates the need to always keep the printer in a state of being capable of communication with the operation terminal before the operation starting operation is performed and, for example, the printer can be kept in a power-off state. As a result, electric power saving can be achieved and the effect is made larger particularly when a battery supplies a power source voltage to operation mechanisms such as the feeder and the printing head.

BRIEF DESCRIPTION OF THE DRAWINGS

FIG. 1 is a view showing a tape printing device to which an embodiment of the present disclosure is applied, along with an operation terminal FIG. 2 is a perspective view of an exterior appearance of the tape printing device with a cartridge cover opened.

FIG. 3 is a conceptual plane view of an internal structure of a cartridge.

FIG. 4 is a block diagram of functional configurations of the tape printing device and the operation terminal.

FIG. 5 is a view of a display example of an input operation screen displayed on a display part when a print data editing application is activated on the operation terminal.

FIGS. 6A-6C are illustrative views for explaining a printing-job transmission and acquisition behavior in a comparative example.

FIGS. 7A-7B are illustrative views for explaining an example of the printing-job transmission and acquisition behavior in an embodiment of the present disclosure.

FIGS. 8A-8C are illustrative views for explaining another example of the printing-job transmission and acquisition behavior in the embodiment of the present disclosure.

FIG. 9 is a flowchart showing control procedures executed by a control circuit of the tape printing device.

FIG. 10 is a view showing a modification example of allowing a user to select one operation terminal at the time of confliction of a plurality of operation terminals.

FIG. 11 is a view showing a modification example in which all the labels are produced as labels with terminal information at the time of confliction of a plurality of operation terminals.

DETAILED DESCRIPTION OF THE PREFERRED EMBODIMENTS

An embodiment of the present disclosure will now be described with reference to the drawings.
<System Configuration>
FIG. 1 shows a tape printing device of this embodiment along with an operation terminal capable of operating the tape printing device. In FIG. 1, a tape printing device 1 and at least one operation terminal 300 (shown as only one terminal in FIG. 1) are connected through well-known mutually-recognized communication (which may be wired communication as in this example or wireless communication) such that information can be transmitted and received.

The operation terminal 300 is, for example, a personal computer (or may be an information terminal such as a smartphone and a PDA). The operation terminal 300 has a display part 301 and an operation part 302, for example. The display part 301 has a display function of displaying various pieces of information and messages. The operation part 302 enables a user to input desired instructions and information. In this example, the operation terminal 300 can transmit a printing job including desired print data through the mutually-apparent communication to the tape printing device 1 to cause the tape printing device 1 to perform printing corresponding to the print data (described in detail later).
<Configuration of Tape Printing Device>
The tape printing device 1 will be described. As shown in FIGS. 1 and 2, the tape printing device 1 includes a housing 2 constituting the outer contour thereof. The housing 2 includes a resin lower cover 15 constituting a device lower surface and integrated with device side surfaces as well as a resin upper cover 17 constituting a device upper surface.

A side surface of the lower cover 15 includes a recess 15b and a discharging exit 15a formed at the center of an innermost part inside the recess to discharge a label tape 109 with print (see FIG. 3 described later).

The upper cover 17 is disposed with, from the front side toward the rear side, a keyboard 3 for performing various operations such as character input, functional keys 4 such as a print button and a power button for causing the tape printing device 1 to perform various functions, and a transparent panel 7 mounted to close an opening portion like a rectangular opening, for example.

The upper cover 17 includes a lid-like cartridge cover 17a that is configured to be openable for mounting a tape cassette-like cartridge 8 on the upper surface rear part side and that opens and closes a cartridge holder 9. A cutout part 17b is provided to an end portion of the cartridge cover 17a. A cut lever 50 is an operation lever for cutting the label tape 109 with print and is provided to be received in the cutout part 17b.

The tape printing device 1 has the cartridge holder 9 provided on the upper surface rear part side thereof such that the cartridge 8 can be attached and detached. This cartridge holder 9 is always closed by the cartridge cover 17a (see FIG. 1) and, when the cartridge cover 17a is opened, the cartridge holder 9 is exposed (see FIG. 2).

Detailed structures of the cartridge 8 and the cartridge holder 9 will be described with reference to FIG. 3. The cartridge 8 has a housing 8A, a first roll 102 (actually having a spiral shape and simplified into a concentrically circular shape in FIG. 3) having a wound belt-shaped base tape 101 located in the housing 8A, a second roll 104 (actually having a spiral shape and simplified into a concentrically circular shape in FIG. 3) having a wound transparent print-receiving tape 103 with substantially the same width as the base tape 101, a ribbon supply side roll 111 feeding out an ink ribbon 105 (not necessary if the print-receiving tape is a thermal tape), a ribbon take-up roller 106 taking up the ink ribbon 105 after print, and a feeding roller 27 rotatably supported in the vicinity of a tape discharging part of the cartridge 8.

The first roll 102 has the base tape 101 wound around a reel member 102a. The base tape 101 includes, for example, a bonding adhesive layer, a base film, an affixing adhesive layer, and a separation sheet laminated in this order from the inner wound side toward the opposite side. The second roll 104 has the print-receiving tape 103 wound around a reel member 104a.

The feeding roller 27 feeds the base tape 101 and the print-receiving tape 103 while pressing and bonding the tapes into the label tape 109 with print.

On the downstream side of the feeding roller 27 and a pressure roller 28 along the transport path of the label tape 109 with print (i.e., on the downstream side of a printing head 23 described later), a fixed blade 40 is provided along with a movable blade 41 advancing toward the fixed blade 40 in accordance with a manual operation of the cut lever 50 to cut the label tape 109 with print in a thickness direction in cooperation with the fixed blade 40.

On the other hand, the cartridge holder 9 is disposed with a ribbon take-up roller driving shaft 107 for taking up the ink ribbon 105 used in the cartridge 8, and a feeding roller driving shaft 108 for transporting the label tape 109 with print. The ribbon take-up roller 106 and the feeding roller 27 described above are rotationally driven in conjunction with each other by transmitting a drive force of a transport roller motor 34 (see FIG. 4 described later) to the ribbon take-up roller driving shaft 107 and the feeding roller driving shaft 108. The printing head 23 performing desired printing on the transported print-receiving tape 103 is provided in the cartridge holder 9 and is positioned at an opening portion of the mounted cartridge 8. The printing head 23 is located away from the movable blade 41 and the fixed blade 40 at a predetermined separation distance along the tape transport path.

<General Operation of Producing Print Tape>

When the cartridge 8 is mounted on the cartridge holder 9 in the configuration described above, the print-receiving tape 103 and the ink ribbon 105 are interposed between the printing head 23 and a platen roller 26 facing thereto. The base tape 101 and the print-receiving tape 103 are interposed between the feeding roller 27 and the pressure roller 28 facing thereto. The ribbon take-up roller 106 and the feeding roller 27 are then rotationally driven in a synchronized manner in respective directions indicated by arrows B and C in FIG. 3. As a result, the feeding roller 27, the pressure roller 28, and the platen roller 26 are rotated, and the base tape 101 is fed out from the first roll 102 and supplied to the feeding roller 27. On the other hand, the print-receiving tape 103 is fed out from the second roll 104 and a print-head driving circuit 31 (see FIG. 4 described later) energizes a plurality of heat generation elements of the printing head 23. As a result, a print is printed on a back surface of the print-receiving tape 103.

The base tape 101 and the print-receiving tape 103 after the printing are bonded and integrated by the feeding roller 27 and the pressure roller 28 into the label tape 109 with print, which is transported outside the cartridge 8 from the tape discharging part. The ink ribbon 105 after printing to the print-receiving tape 103 is taken up by the ribbon take-up roller 106 driven by the ribbon take-up roller driving shaft 107.

The label tape 109 with print transported outside the cartridge 8 as described above is cut by the fixed blade 40 and the movable blade 41 cooperating with each other base on a manual operation of the cut lever 50, and a print label L (see FIGS. 6A-6C described later) is generated. Since the label tape 109 with print includes the print-receiving tape 103 after printing as described above, the fixed blade 40 and the movable blade 41 fulfill a function of cutting the print-receiving tape 103 after printing. As described above, the cutting in this case is achieved by transmitting the manual operation of the cut lever 50 by a user via a mechanism not shown to the movable blade 41 and causing the movable blade 41 to advance toward the fixed blade 40 so that the movable blade 41 and the fixed blade 40 are closed like scissors.

<Functional Configurations of Tape Printing Device and Operation Terminal>

Functional configurations of the tape printing device 1 and the operation terminal 300 will be described with reference to FIG. 4.

In FIG. 4, the tape printing device 1 includes the printing head 23 performing desired printing on the print-receiving tape 103, the print-head driving circuit 31 controlling and causing the printing head 23 to perform a print operation of desired print contents for the print-receiving tape 103, a transport roller motor 34 driving the ribbon take-up roller driving shaft 107 and the feeding roller driving shaft 108, a transport roller driving circuit 35 controlling the transport roller motor 34, a movable blade sensor 36 detecting a state of completion of cutting of the label tape 109 with print including the print-receiving tape 103 by the movable blade 41, a cartridge sensor 32 detecting a type of the cartridge 8 mounted on the cartridge holder (in other words, various tape attributes such as tape width of the print-receiving tape 103) with a known technique, a control circuit 140 controlling the overall operation of the tape printing device 1 via the print-head driving circuit 31, the transport roller driving circuit 35, etc., an operation part 141 such as the keyboard 3 and the functional keys 4, a display part 143, a memory 144 consisting of a RAM and a ROM, for example, and a communication control part 142 performing the mutually-recognized communication including connection authentication through a known technique with the operation terminal 300.

The memory 144 includes a communication history storage part 144a. The communication history storage part 144a stores identification information (such as names and IDs) of a plurality of the operation terminals 300, operation terminals 300A, 300B, etc. (see FIGS. 10 and 11 described later) with which communications were performed via the communication control part 142 in the past (in other words, of which communication history exists). It is noted that a print processing program for executing procedures of a flow of FIG. 9 described later is stored in the ROM of the memory 144.

The operation terminal 300 includes a CPU 303, a memory 304 consisting of, for example, a RAM and a ROM, the operation part 302, the display part 301, a mass storage device 305 consisting of a hard disk device etc. and storing various pieces of information, and a communication control part 306 transmitting and receiving information to/from the at least one tape printing device 1 through the mutually-recognized communication.

The CPU 303 executes a signal process in accordance with a program stored in advance in the ROM while using a temporary storage function of the RAM, thereby transmitting and receiving various instruction and information signals to/from the tape printing device 1.

<Specific Example of Editing Process>

An example of an editing operation for producing the printing job described above on the above operation terminal 300 will be described with reference to FIG. 5. FIG. 5 shows a display example of an input operation screen displayed on the display part 301 when a print data editing application is activated on the operation terminal 300. A shown input operation screen 200 of the print data editing application displays, for example, a print data image R1 produced by using a template etc. The template is data stored in the memory 304, for example, and is data having a graphic image, a character entry field, and arrangement information thereof integrated in an area defined by a tape width and a tape length. A user can use this template to process an appropriate graphic image and input arbitrary text character information into the character entry field with the keyboard 3 etc., thereby easily producing the print data. In this example, the tape width can selectively be set from respective tape widths corresponding to a plurality of types of the cartridges 8 by using a pull-down menu 201. The tape width of the already produced print data can be changed as described above to scale up/down the print data image R1 in the width direction. In the shown example, the print data with the tape length (label length) of 58 mm, the tape width of 24 mm, and the text "ABCD" is produced.

A search wait instruction button 202 will be described later.

Background of Technique of Embodiment

A feature of this embodiment is to search for the operation terminal 300 retaining a printing job in an unsent state from the tape printing device 1 (described in detail later) and will be described after describing the background of the necessity of such a configuration with reference to a comparative example shown in FIGS. 6A-6C.

As described above, the tape printing device 1 according to this embodiment can receive a printing job produced by the operation terminal 300 to generate a corresponding print label L by using the print data included in the printing job. In this case, the printing job produced by the operation terminal 300 may have contents unacceptable for (not conforming to an accepting condition of) the tape printing device 1. For example, this accepting condition may be a tape attribute etc. of the print-receiving tape 103. Specifically, a tape attribute (e.g., tape width) assumed in the printing job produced by the operation terminal 300 may not match the tape attribute (for example, the tape width) of the print-receiving tape 103 in the cartridge 8 actually mounted on the tape printing device 1.

For example, as shown in FIG. 6A, it is assumed that the print-receiving tape 103 having the tape width of 12 mm is included in the cartridge 8 mounted on the tape printing device 1. It is also assumed that a user uses the operation terminal 300 without knowing it to produce a printing job (including print data of text characters "ABCD" in the example of FIG. 5) on the assumption of the print-receiving tape 103 having the tape width of 24 mm (on the input operation screen 200 described above) and then transmits the printing job to the tape printing device 1.

In this case, due to a difference between the width of 12 mm of the print-receiving tape 103 in the tape printing device 1 and the width of 24 mm in the printing job, the operation terminal 300 normally displays an error display, for example, "unable to produce label due to tape width error."

As a result, as shown in FIG. 6B, the user has to go to the place at which the tape printing device 1 is located, and replaces the print-receiving tape 103 of tape printing device 1 (in other words, the cartridge 8) to conform to the tape width (24 mm) of the print job.

Subsequently, as shown in FIG. 6C, the user returns to the operation terminal 300 and sends the printing job again to the tape printing device 1. As a result, since the tape width (24 mm) related to the printing job matches the actual tape width (24 mm) in the tape printing device 1, the error display is no longer performed, and the corresponding print label L is finally produced.

As described above, in the shown comparative example, after once going from the operation terminal 300 to the tape printing device 1, the user must take trouble to return to the operation terminal 300 and transmit the printing job to the tape printing device 1 again, which leads to large burdens of movement and operation.

Feature of Embodiment

A technique of this embodiment for avoiding the disadvantage described above will hereinafter be described in detail in order. In this embodiment, when a printing job is produced in the operation terminal 300 as described above, the operation terminal 300 retains the printing job in an unsent state rather than immediately transmitting to the tape printing device 1. Therefore, as shown in FIG. 5, the input operation screen 200 of the operation terminal 300 has a search wait instruction button 202 (that may also be used as a so-called "print" instruction button) for entering a state of waiting for a search from the tape printing device 1 (described in detail later). By operating the search wait instruction button 202, the operation terminal 300 enters a standby state of waiting for a search from the tape printing device 1.

For example, when the print-receiving tape 103 having the tape width of 12 mm is mounted on the tape printing device 1 as described above and a user uses the operation terminal 300 to produce a printing job (including print data of text characters "ABCD" in FIG. 5) of the tape width of 24 mm and then operates the search wait instruction button 202, the produced printing job is once retained in the operation terminal 300 as shown in FIG. 7A.

In this case, although the actual tape width (12 mm in this example) of the print-receiving tape 103 is detected by the cartridge sensor 32 in the tape printing device 1, the printing job (24 mm in tape width) is not transmitted to the tape printing device 1 and is retained in the operation terminal 300 as described above, so that the "error display" as in the comparative example is not performed.

In this state, as shown in FIG. 7B, the user goes to the tape printing device 1. The user then notices that the width (12 mm) of the print-receiving tape 103 actually mounted on the tape printing device 1 does not conform to the tape width (24 mm) of the printing job produced by the user, and replaces the print-receiving tape 103 of tape printing device 1 with another print-receiving tape 103 having the tape width of 24 mm.

Subsequently, when the user presses the print button included in the functional keys 4 of the tape printing device 1, the tape printing device 1 starts searching whether any operation terminal retains a printing job with the tape width of 24 mm (this searching is performed for all the operation terminals having the identification information stored in the communication history storage part 144a as described above). In this example, since the operation terminal 300 already retaining the print job of 24 mm in tape width is hit in the search, the printing job retained in the operation terminal 300 is transmitted to the tape printing device 1 and acquired by the tape printing device 1. As a result, the tape printing device 1 produces the 24-mm-wide print label L including the text "ABCD" in accordance with the print data included in the received printing job. Therefore, after pressing the print button, the user does not have to return to the operation terminal 300 and the production of the print label L is executed on site.

FIGS. 8A-8C show the case that the user presses the print button before replacing the print-receiving tape 103 as described above. Specifically, while the printing job with the tape width of 24 mm produced by the user is retained in the operation terminal 300 as shown in FIG. 8A similar to FIG. 7A described above, the user goes to the tape printing device 1 (with the print-receiving tape 103 having the tape width of 12 mm mounted) and presses the print button without noticing the difference in tape width as shown in FIG. 8B.

In this case, as is the case with FIGS. 7A-7B, the tape printing device 1 starts searching whether any operation terminal retains a printing job with the tape width of 12 mm. However, since the tape width of the printing job retained in the operation terminal 300 is 24 mm and does not match, the operation terminal 300 is not hit in this search. Therefore, the printing job retained in the operation terminal 300 is not transmitted to the tape printing device 1.

At this point, the user recognizes a mismatch of tape width as shown in FIG. 8C (e.g., from a result of no hit in the search appropriately displayed on the display part 143) and replaces the print-receiving tape 103 of the tape printing device 1 with another print-receiving tape 103 having the tape width of 24 mm. Subsequently, when the user presses the print button again, the search is started for an operation terminal retaining the printing job with the tape width of 24 mm and the operation terminal 300 is hit in the search as is the case with FIGS. 7A-7B. As a result, the printing job retained in the operation terminal 300 is transmitted to the tape printing device 1 and the 24-mm-wide print label L including the text "ABCD" is produced. Also in this case, the user does not have to return to the operation terminal 300 and the production of the print label L is executed on site as in the above description.

<Control Procedures Executed by Control Circuit>

A flowchart of FIG. 9 shows control procedures executed by the control circuit 140 of the tape printing device 1 for achieving the technique described above.

First, at step S10 of FIG. 9, the control circuit 140 determines whether the print button in the functional keys 4 of the tape printing device 1 is pressed by a user. If the print button is not pressed by a user, the determination of step S10 is negative (S10:NO), and the control circuit 140 waits in a loop. If the print button is pressed by a user, the determination of step S10 is affirmative (S10:YES), and the control circuit 140 goes to step S15.

At step S15, the control circuit 140 acquires a tape attribute (tape width in this example) corresponding to a type of the mounted cartridge 8 based on the detection result of the cartridge sensor 32.

Subsequently, at step S20, the control circuit 140 searches whether any of the operation terminals 300 retains the printing job conforming to the tape width detected at step S15. Specifically, the control circuit 140 communicates via the communication control part 142 with all the operation terminals 300 etc. having a communication history stored in the communication history storage part 144a and determines whether any of the operation terminals 300 retains a printing job conforming to the tape width acquired at step S15.

Subsequently, at step S25, the control circuit 140 determines whether an operation terminal is hit in the search at step 20. If no operation terminal is hit in the search, the determination of step S25 is negative (S25:NO), and the control circuit 140 returns to the step S15 and repeat the subsequent procedures. If at least one operation terminal is hit in the search (in other words, if at least one printing job conforms to the tape width acquired at the step S15), the determination of step S25 is affirmative (S25:YES), and the control circuit 140 goes to step S30.

At step S30, the control circuit 140 outputs, for example, a job transmission request to the operation terminal 300 etc. hit at the step S25 and receives (acquires) the printing job retained by the operation terminal.

Subsequently, at step S35, the control circuit 140 starts transporting the print-receiving tape 103. Specifically, the control circuit 140 outputs a command signal instructing the transport roller driving circuit 35 to start driving so as to rotate the feeding roller driving shaft 108 via the transport roller motor 34, thereby starting the transport of the print-receiving tape 103, the base tape 101, and the label tape 109 with print.

At step S40, the control circuit 140 determines based on the print data in the print job acquired at step S30 whether the tapes started being transported as described above arrive at a print start position of the print-receiving tape 103. Specifically, the control circuit 140 determines with a known technique whether the downstream tip end portion of the print area described above faces the position facing the printing head 23. If not arriving at the print start position, the determination is negative (S40:NO) and the control circuit 140 returns to step S35 to transport the tapes to the print start position. If arriving at the print start position, the determination is affirmative (S40:YES) and the control circuit 140 goes to step S45.

At step S45, the control circuit 140 carries out energization control of the heat generation elements (not shown) of the printing head 23 via the print-head driving circuit 31 to form the print ("ABCD" in the example described above) corresponding to the print data in the print job acquired at step S30 on the print-receiving tape 103.

Subsequently, at step S50, the control circuit 140 further performs the tape feeding after completion of the print formation process of step S45 and determines whether the printing head 23 is faced by a boundary position corresponding to a print end position on the print-receiving tape 103. If the printing head 23 is not faced by the boundary position, the determination is negative (S50:NO) and the control circuit 140 returns to step S45 to repeat the same procedure. On the other hand, if the printing head 23 is faced by the boundary position, the determination is affirmative (S50:YES) and the control circuit 140 goes to step S55.

At step S55, the control circuit 140 stops energizing the heat generation elements of the print head 23 via the print drive circuit 31 and stops printing on the print-receiving tape 103.

Subsequently, at step S60, the control circuit 140 outputs a command signal instructing the transport roller driving circuit 35 to perform driving so as to start the transport roller motor 34 to rotate the feeding roller driving shaft 108, thereby performing the tape feeding by a distance corresponding to a separation distance between the printing head 23 and the movable blade 41.

Subsequently, going to step S65, the control circuit 140 outputs a command signal instructing the transport roller driving circuit 35 to stop driving so as to stop the feeding roller driving shaft 108 rotated by the transport roller motor 34 and terminate the tape feeding, thereby achieving the standby state of waiting for cutting by the movable blade 41.

At step S70, the control circuit 140 determines based on the detection result of the movable blade sensor 36 described above whether the movable blade 41 cuts the boundary position in accordance with a manual operation of the cut lever 50. If the user does not perform the manual operation as described above, the determination of step S70 is negative (S70:NO) and the control circuit 140 continues waiting in a loop until the determination of step S70 becomes affirmative. If the movable blade 41 cuts the boundary position in accordance with a manual operation of the cut lever 50, the determination of step S70 is affirmative (S70:YES) and this flow is then terminated.

Advantages of this Embodiment

As described above, in this embodiment, the operation terminal 300 retains the printing job in the unsent state and, in this state, the tape printing device 1 searches for an operation terminal having a printing job conforming to the accepting condition (the tape width defined as the tape attribute in the example) of the tape printing device 1 and receives the printing job only from the conforming operation terminal 300 to generate the corresponding print label L. Therefore, even if the tape attribute of the printing job produced in the operation terminal 300 does not match that of the tape printing device 1, the user only requires to go to the tape printing device 1 and replace the print-receiving tape 130 (replace the cartridge 9 in the example) to conform to the tape attribute of the printing job for producing the print label L corresponding to the printing job without operating the operation terminal 300 again to transmit the printing job (see FIGS. 7B and 8C). As a result, for example, the burdens of movement and operation described in the comparative example of FIGS. 6A-6C can be reduced and the convenience can therefore be improved.

Particularly in this case, the search at step S20 is triggered by the operation of the print button (or the power button) in the functional keys 4 (in other words, input of an action-starting operation). This eliminates the need to always keep the tape printing device 1 in a state of being capable of communication with the operation terminal 300 before the operation is performed and, for example, the tape printing device 1 can be kept in a power-off state. As a result, electric power saving can be achieved. The effect is made larger particularly when a battery supplies a power source voltage to operation mechanisms such as a feeding system (the transport roller motor 34 in the above description) and the printing head 23 (see a modification example described later).

Particularly in this embodiment, at step S20 of the flow shown in FIG. 9, the control circuit 140 searches for an operation terminal based on the communication history stored in the communication history storage part 144a. As a result, the control circuit 140 can sequentially access and search a plurality of the operation terminals having communicated with the tape printing device 1 in the past and can smoothly and reliably determine the conformity of the printing job to the accepting condition.

The present disclosure is not limited to the embodiment and can variously be modified without departing from the spirit and the technical ideas thereof. Such modification examples will hereinafter be described in order. In the modification examples, the parts equivalent to those of the embodiment are denoted by the same reference numerals and will not be described or will be described in a simplified manner as needed.

(1) When User is Allowed to Select One Terminal at Time of Conflict of Multiple Operation Terminals For example, as shown in FIG. 10, the tape printing device 1 and two operation terminals 300A, 300B may be connected such that mutual communication can be performed via a communication network NW. In such a case, if the tape attribute of the printing jobs produced and retained on the operation terminals 300A, 300B matches the tape attribute of the printing-receiving tape 103 of the tape printing device 1 (i.e., if the two operation terminals 300A, 300B are hit at step S25 of FIG. 9), the printing jobs of these two operation terminals 300A, 300B conflict with each other.

This modification example corresponds to such a case, and the display part 143 of the tape printing device 1 displays "which job is executed?" and, at the same time, displays contents of the printing job on the operation terminal 300A (text characters "ABCD" in the shown example) and contents of the printing job on the operation terminal 300B (text characters "EFGH" in the shown example) in a selectable state. When the operator operates, for example, the keyboard 3 to selects either one, the printing job is acquired from the selected operation terminal as described above and the corresponding print label L is produced.

The same advantage as above is acquired also in this modification example.

(2) When all Labels are Produced as Labels with Terminal Information at Time of Conflict of Multiple Operation Terminals In this modification example, when a plurality of the operation terminals 300A, 300B, etc. conflicts, the printing jobs of all the operation terminals 300A, 300B are sequentially executed to produce the print labels L instead of selecting any one operation terminal as in (1) described above. In this case, the terminal information is added to the print labels L. In particular, as shown in FIG. 11, both a print label L1 of "ABCD" corresponding to the printing job retained by the operation terminal 300A and a printing label L2 of "EFGH" corresponding to the printing job retained by the operation terminal 300B are sequentially produced. In this case, terminal information PCA (character representation "terminal A" in this example) corresponding to the operation terminal 300A is added to the printing label L1, and terminal information PCA (character representation "terminal B" in this example) corresponding to the operation terminal 300B is added to the print label L2.

In addition to the same advantage as the embodiment, this modification example has the advantage that the print labels L corresponding to the respective printing jobs of a plurality of operation terminals can be produced and that the correspondence relationship of the print labels L1, L2 and the operation terminals 300A, 300B can easily be identified in such a case.

(3) Other

Although the operation terminals 300, 300A, 300B enter the standby state of waiting for the search from the tape printing device 1 in the above description when the search wait instruction button 202 of the input operation screen 200 is operated after a printing job is produced (see FIG. 5), this operation may be eliminated and the operation terminals may enter the standby state immediately after completion of the production of the print job. In this case, the search wait instruction button 202 is eliminated.

If the tape printing device 1 includes a battery storage part and a battery stored in the battery storage part supplies a power supply voltage to a plurality of operation mechanisms such as the feeding roller driving shaft 108 and the printing head 23 (in the case of a so-called battery-driven machine), the search from the tape printing device 1 may be started when the power button (not shown) giving a power-on instruction is turned on, instead of the operation of the print button.

Also in the modification example, the same advantage as the embodiment can be acquired.

In the above description, the arrows shown in FIG. 4 indicate an example of signal flow and are not intended to limit the signal flow directions.

The flowchart shown in FIG. 9 is not intended to limit the present disclosure to the procedures shown in the flow and the procedures may be added/deleted or may be executed in different order without departing from the spirit and the technical ideas of the disclosure.

The techniques of the embodiment and modification examples may appropriately be utilized in combination other than those described above.

What is claimed is:

1. A printer comprising:
   a feeder configured to feed a print-receiving medium,
   a printing head configured to perform a print on said print-receiving medium fed by said feeder,
   a communicating device configured to execute mutually-recognized communication with at least one operation terminal that retains a printing job for requesting production of a printed matter in an unsent state,
   a detecting device configured to detect an attribute of said print-receiving medium fed by said feeder,
   a processor, and
   a first memory, said first memory storing computer-executable instructions that, when executed by said processor, cause said printer to perform:
      a starting operation accepting process for receiving a signal of a predetermined action-starting operation;
      a terminal searching process for searching whether any of said operation terminals retains said printing job having an attribute conforming to said attribute detected by said detecting device, by performing said mutually-recognized communication via said communicating device triggered by reception of said signal of said action-starting operation in said starting operation accepting process;
      a job receiving process for, in a case that some of said operation terminals retain said printing job having said attribute conforming to said attribute in said terminal searching process, receiving the printing job from the operation terminal by said mutually-recognized communication via said communicating device; and
      a coordination control process for controlling said printing head and said feeder in coordination with each other in the manner that said printed matter in accordance with print data included in said printing job received in said job receiving process is produced.

2. The printer according to claim 1, wherein said first memory stores instructions that, when executed by said processor, cause said printer to further perform
   a job request transmitting process for, in the case that some of said operation terminals retains said printing job having said attribute conforming to said attribute in said terminal searching process, transmitting a job transmission request to said operation terminal by said mutually-recognized communication via said communicating device, wherein
   in said job receiving process, said printing job transmitted from said operation terminal in response to said job transmission request transmitted in said job request transmitting process is received.

3. The printer according to claim 1, wherein
   said action-starting operation is a production instruction operation for said printed matter or a power-on operation for said printer, wherein
   in said terminal searching process, in a case that said production instruction operation or said power-on operation is performed, it is searched whether any of said operation terminals retains said printing job having said attribute conforming to said attribute detected by said detecting device.

4. The printer according to claim 3, further comprising a battery storage part configured to store a battery that supplies a power source voltage to a plurality of operation mechanisms including said feeder and said printing head,
   wherein said action-starting operation is a power-on operation for said printer, and
   wherein in said terminal searching process, in a case that a signal of said power-on operation is received, it is searched whether any of said operation terminals retains said printing job having said attribute conforming to said attribute detected by said detecting device.

5. The printer according to claim 1, further comprising a second memory storing identification information of a plurality of said operation terminals where a history of communication in the past to the operation terminals via said communicating device exists,
   wherein in said terminal searching process, said mutually-recognized communication with said plurality of said operation terminals is sequentially performed wherein said identification information of said plurality of said operation terminals are stored in said second memory, and thereby it is searched whether any of said operation terminals retains said printing job having said attribute conforming to said attribute detected by said detecting device.

6. The printer according to claim 1, wherein said feeder is configured to feed a print-receiving tape as said print-receiving medium,
   wherein said printing head is configured to perform a print on said print-receiving tape fed by said feeder,
   wherein said detecting device is configured to detect as said attribute, a tape attribute of said print-receiving tape,
   wherein in said terminal searching process, it is searched whether any of said operation terminals retains said printing job having said attribute conforming to said tape attribute detected by said detecting device,
   wherein in said job receiving process, in a case that some of said operation terminals retains said printing job having said attribute conforming to said tape attribute in said terminal searching process, the printing job is received from the operation terminal, and
   wherein in said coordination control process, said printing head and said feeder are controlled in coordination with each other in the manner that a print tape as said printed matter in accordance with print data included in said printing job received in said job receiving process is produced.

7. The printer according to claim 6, further comprising a cartridge holder configured to attach and detach a tape cartridge configured to supply said print-receiving tape,
   wherein said feeder is configured to feed said print-receiving tape supplied from said tape cartridge mounted on said cartridge holder,
   wherein said detecting device is configured to detect a tape width of said print-receiving tape as said tape attribute,
   wherein in said terminal searching process, it is searched whether any of said operation terminals retains said printing job having said attribute conforming to said tape width detected by said detecting device, and
   wherein in said job receiving process, in the case that some of said operation terminals retains said printing job having said attribute conforming to said tape width in said terminal searching process, the printing job is received from the operation terminal.

8. The printer according to claim 5, wherein said first memory stores instructions that, when executed by said processor, cause said printer to further perform
a selection accepting process for, in the case that a plurality of said operation terminals retains said printing jobs having said attribute conforming to said attribute detected by said detecting device, receiving a signal of selection of which operation terminal said printing job is received from, and
wherein in said job receiving process, said printing job from said operation terminal selected in said selection accepting process is received.

9. The printer according to claim 8, further comprising
a display, and
a keyboard,
wherein said first memory stores instructions that, when executed by said processor, cause said printer to further perform
a displaying process for causing said display to display names of operation terminals retaining said printing jobs having said attribute conforming to said attribute detected by said detecting device and contents of said printing jobs, and
wherein in said selection accepting process, said signal of said selection by an operation with said keyboard is received, wherein said selection corresponds to the display of names of said operation terminals and contents of said printing jobs in said display in said displaying process.

10. The printer according to claim 5, wherein in the case that a plurality of said operation terminals retains said printing jobs having said attribute conforming to said attribute detected by said detecting device, in said job receiving process, said printing jobs from each of said plurality of said operation terminals are sequentially received, and
wherein in said coordination control process, said printing head and said feeder are controlled in coordination with each other in the manner that a plurality of said printed matters are respectively produced in accordance with said print data included in said printing jobs received from each of said plurality of said operation terminals in said job receiving process.

11. The printer according to claim 10, wherein in said coordination control process, said printing head and said feeder are controlled in coordination with each other in the manner that a plurality of said printed matters each including terminal information of a corresponding one of said operation terminals added thereto are produced.

12. A printer comprising:
a feeder configured to feed a print-receiving medium,
a printing head configured to perform a print on said print-receiving medium fed by said feeder,
a communicating device configured to execute mutually-recognized communication with at least one operation terminal that retains a printing job for requesting production of a printed matter in an unsent state,
a detecting device configured to detect an accepting condition of said print-receiving medium fed by said feeder, the accepting condition being related to whether print data from said operation terminal is acceptable,
a processor, and
a first memory, said first memory storing computer-executable instructions that, when executed by said processor, cause said printer to perform:
a starting operation accepting process for receiving a signal of a predetermined action-starting operation;
a terminal searching process for searching whether any of said operation terminals retains said printing job conforming to said accepting condition detected by said detecting device, by performing said mutually-recognized communication via said communicating device triggered by reception of said signal of said action-starting operation in said starting operation accepting process;
a job receiving process for, in a case that some of said operation terminals retain said printing job conforming to said accepting condition in said terminal searching process, receiving the printing job from the operation terminal by said mutually-recognized communication via said communicating device; and
a coordination control process for controlling said printing head and said feeder in coordination with each other in the manner that said printed matter in accordance with print data included in said printing job received in said job receiving process is produced,
a second memory storing identification information of a plurality of said operation terminals where a history of communication in the past to the operation terminals via said communicating device exists,
wherein in said terminal searching process, said mutually-recognized communication with said plurality of said operation terminals is sequentially performed wherein said identification information of said plurality of said operation terminals are stored in said second memory, and thereby it is searched whether any of said operation terminals retains said printing job conforming to said accepting condition.

13. The printer according to claim 12, wherein said first memory stores instructions that, when executed by said processor, cause said printer to further perform
a selection accepting process for, in the case that a plurality of said operation terminals retains said printing jobs conforming to said accepting condition, receiving a signal of selection of which operation terminal said printing job is received from, and
wherein in said job receiving process, said printing job from said operation terminal selected in said selection accepting process is received.

14. The printer according to claim 13, further comprising
a display, and
a keyboard,
wherein said first memory stores instructions that, when executed by said processor, cause said printer to further perform
a displaying process for causing said display to display names of operation terminals retaining said printing jobs conforming to said accepting condition and contents of said printing jobs, and
wherein in said selection accepting process, said signal of said selection by an operation with said keyboard is received, wherein said selection corresponds to the display of names of said operation terminals and contents of said printing jobs in said display in said displaying process.

15. The printer according to claim 12, wherein in the case that a plurality of said operation terminals retains said printing jobs conforming to said accepting condition, in said job receiving process, said printing jobs from each of said plurality of said operation terminals are sequentially received, and wherein in said coordination control process, said printing head and said feeder are controlled in coordination with each other in the manner that a plurality of said printed matters are respectively produced in accordance with said print data included in said printing jobs received from each of said plurality of said operation terminals in said job receiving process.

16. The printer according to claim 15, wherein in said coordination control process, said printing head and said feeder are controlled in coordination with each other in the manner that a plurality of said printed matters, each including terminal information of a corresponding one of said operation terminals added thereto, are produced.

17. A printer comprising:
a feeder configured to feed a print-receiving medium,
a printing head configured to perform a print on said print-receiving medium fed by said feeder,
a communicating device configured to execute mutually-recognized communication with at least one operation terminal that retains a printing job for requesting production of a printed matter in an unsent state,
a detecting device configured to detect an accepting condition of said print-receiving medium fed by said feeder, the accepting condition being related to whether print data from said operation terminal is acceptable,
a processor, and
a first memory, said first memory storing computer-executable instructions that, when executed by said processor, cause said printer to perform:
  a starting operation accepting process for receiving a signal of a predetermined action-starting operation;
  a terminal searching process for searching whether any of said operation terminals retains said printing job conforming to said accepting condition detected by said detecting device, by performing said mutually-recognized communication via said communicating device triggered by reception of said signal of said action-starting operation in said starting operation accepting process;
  a job receiving process for, in a case that some of said operation terminals retain said printing job conforming to said accepting condition in said terminal searching process, receiving the printing job from the operation terminal by said mutually-recognized communication via said communicating device; and
  a coordination control process for controlling said printing head and said feeder in coordination with each other in the manner that said printed matter in accordance with print data included in said printing job received in said job receiving process is produced,
wherein said feeder is configured to feed a print-receiving tape as said print-receiving medium,
wherein said printing head is configured to perform a print on said print-receiving tape fed by said feeder,
wherein said detecting device is configured to detect a tape attribute of said print-receiving tape as said accepting condition,
wherein in said terminal searching process, it is searched whether any of said operation terminals retains said printing job conforming to said tape attribute detected by said detecting device,
wherein in said job receiving process, in a case that some of said operation terminals retains said printing job conforming to said tape attribute in said terminal searching process, the printing job is received from the operation terminal, and
  wherein in said coordination control process, said printing head and said feeder are controlled in coordination with each other in the manner that a print tape as said printed matter in accordance with print data included in said printing job received in said job receiving process is produced.

18. The printer according to claim 17, further comprising a cartridge holder configured to attach and detach a tape cartridge configured to supply said print-receiving tape,
wherein said feeder is configured to feed said print-receiving tape supplied from said tape cartridge mounted on said cartridge holder,
wherein said detecting device is configured to detect a tape width of said print-receiving tape as said tape attribute,
wherein in said terminal searching process, it is searched whether any of said operation terminals retains said printing job conforming to said tape width detected by said detecting device, and
wherein in said job receiving process, in the case that some of said operation terminals retains said printing job conforming to said tape width in said terminal searching process, the printing job is received from the operation terminal.

* * * * *

UNITED STATES PATENT AND TRADEMARK OFFICE
CERTIFICATE OF CORRECTION

PATENT NO. : 10,055,172 B2
APPLICATION NO. : 15/438849
DATED : August 21, 2018
INVENTOR(S) : Kazuya Nakagawa et al.

It is certified that error appears in the above-identified patent and that said Letters Patent is hereby corrected as shown below:

In the Claims

In Column 14, Claim 6, Line 34:
Please delete "configured to detect as" and insert --configured to detect, as--

In Column 15, Claim 11, Line 49:
Please delete "said printed matters each including" and insert --said printed matters, each including--

In Column 15, Claim 11, Line 51:
Please delete "terminals added thereto are produced" and insert --terminals added thereto, are produced--

Signed and Sealed this
Twenty-ninth Day of January, 2019

Andrei Iancu
*Director of the United States Patent and Trademark Office*